United States Patent
McIntyre et al.

(10) Patent No.: US 9,586,448 B2
(45) Date of Patent: Mar. 7, 2017

(54) TIRE PRESSURE MONITORING SENSOR WITH CHANGING FUNCTIONALITY BASED UPON VEHICLE ACTION

(71) Applicant: Continental Automotive Systems, Inc., Auburn Hills, MI (US)

(72) Inventors: Matthew D. McIntyre, New Baltimore, MI (US); Jean-Christophe Deniau, Fenton, MI (US); Brian J. Farrell, Troy, MI (US); Yasser Gad, Macomb, MI (US)

(73) Assignee: Continental Automotive Systems, Inc., Deer Park, IL (US)

( * ) Notice: Subject to any disclaimer, the term of this patent is extended or adjusted under 35 U.S.C. 154(b) by 275 days.

(21) Appl. No.: 14/182,801

(22) Filed: Feb. 18, 2014

(65) Prior Publication Data

US 2014/0292505 A1    Oct. 2, 2014

Related U.S. Application Data

(60) Provisional application No. 61/770,902, filed on Feb. 28, 2013.

(51) Int. Cl.
*B60C 23/00*    (2006.01)
*B60C 23/04*    (2006.01)

(52) U.S. Cl.
CPC ........ *B60C 23/044* (2013.01); *B60C 23/0461* (2013.01); *B60C 23/0462* (2013.01); *B60C 23/0471* (2013.01)

(58) Field of Classification Search
CPC .............. B60C 23/044; B60C 23/0461; B60C 23/0462; B60C 23/0471
See application file for complete search history.

(56) References Cited

U.S. PATENT DOCUMENTS

| | | | |
|---|---|---|---|
| 6,445,286 B1 * | 9/2002 | Kessler | B60C 23/0408 340/442 |
| 8,266,465 B2 | 9/2012 | Hardman et al. | |
| 2005/0110623 A1 | 5/2005 | Schulze et al. | |
| 2005/0235744 A1 | 10/2005 | Ogawa | |

(Continued)

OTHER PUBLICATIONS

International Search Report for PCT/US2014/017925, date May 23, 2014, 9 pages.

*Primary Examiner* — Kerri McNally
*Assistant Examiner* — Renee Dorsey (57) ABSTRACT

A tire pressure monitoring system includes a plurality of tire pressure monitoring sensors including low frequency wireless receivers and high frequency wireless transmitters. The system further includes a plurality of low frequency transmitters each being disposed proximate one of the plurality of tire pressure monitoring sensors. The system further includes a control module in communication with the plurality of tire pressure monitoring sensors through the plurality of low frequency transmitters. In a first phase of operation the control module causes the low frequency transmitters to transmit low frequency wireless signals to the tire pressure monitoring sensors causing the tire pressure monitoring sensors to transmit data to the control module at a rate. In a second phase or operation the tire pressure monitoring sensors transmit data to the control module at a second rate.

19 Claims, 5 Drawing Sheets

(56) References Cited

U.S. PATENT DOCUMENTS

| | | |
|---|---|---|
| 2008/0062004 A1 | 3/2008 | Hammerschmidt |
| 2009/0179747 A1 | 7/2009 | Lin et al. |
| 2009/0207010 A1* | 8/2009 | Huang ................ B60C 23/007 340/447 |
| 2012/0072071 A1* | 3/2012 | Li ...................... B60C 23/0461 701/36 |
| 2012/0152008 A1* | 6/2012 | Yu ........................ B60C 23/044 73/146.5 |
| 2014/0043153 A1* | 2/2014 | Lim .................... B60C 23/0486 340/447 |
| 2014/0217342 A1* | 8/2014 | Dondurur ................ B60S 9/12 254/423 |

* cited by examiner

TIRE PRESSURE MONITORING SENSOR WITH CHANGING FUNCTIONALITY BASED UPON VEHICLE ACTION

CROSS-REFERENCE TO RELATED APPLICATION

This patent claims benefit under 35 U.S.C. §119 (e) to U.S. Provisional application No. 61/770,902, filed Feb. 28, 2013 and entitled "Tire Pressure Monitoring Sensor With Changing Functionality Based Upon Vehicle Action," the contents of which are incorporated herein by reference in their entirety.

TECHNICAL FIELD

The present invention relates to methods, system and devices for monitoring tire pressure data of vehicle wheel units.

BACKGROUND OF THE INVENTION

Tire pressure monitoring sensors are utilized to monitor air pressure within vehicle tires and transmit data related to the tire pressure to a control module of a tire pressure monitoring system. To ensure that the driver of a vehicle is kept apprised of air pressure within the vehicle tires, tire pressure monitoring sensors collect data pertaining to tire pressure and periodically transmit such collected data to the control module of the tire pressure monitoring system. The periodicity of transmission is typically regulated by government entities and varies from manufacturer to manufacturer of tire pressure monitoring sensors.

In designing tire pressure monitoring sensors, manufacturers must be cognizant of battery life. Many functions of the tire pressure monitoring sensor utilizes power and shortens battery life. However, the transmission of tire pressure data utilizes a relatively large amount of energy. Accordingly, the greater frequency of data transmission, the more battery power must be supplied, which inherently adds cost to the tire pressure monitoring sensor, or shortens life expectancy of the battery and hence tire pressure monitoring sensor. It should be appreciated that once the battery of a tire pressure monitoring sensor is depleted or below an accepted range, the entire tire pressure monitoring sensor must be replaced.

SUMMARY OF THE INVENTION

The present invention provides methods, systems and devices for monitoring tire pressure data of wheel units of vehicles. More particularly, the present invention provides methods, systems and devices that prolong battery life of tire pressure monitoring systems. The features of the present invention are predicated, in part, on a tire pressure monitoring sensor having changing functionality, and battery usage rate, based upon vehicle action, such as parking mode, running mode, or time spent in running mode. In one exemplary embodiment, the change in functionality is predicated upon a change in signal transmission provided by a control module of the tire pressure monitoring system, wherein, the control module modifies signals being transmitted to the tire pressure monitoring sensor, which further results in a reduction in the transmission rate of tire pressure data by the tire pressure monitoring sensors. Hence, the number of tire pressure data transmissions is reduced thereby reducing battery usage of the tire pressure monitoring sensor. This is particularly advantageous for tire pressure monitoring sensors that are design to have multiple applications and multiple transmission configurations.

In view of the foregoing, in a first aspect, the present invention provides a tire pressure monitoring system. The system includes a plurality of tire pressure monitoring sensors, each of the tire pressure monitoring sensors including a low frequency wireless receiver and a high frequency wireless transmitter. The system further includes a plurality of low frequency transmitters, each of the low frequency wireless transmitters being disposed proximate one of the plurality of tire pressure monitoring sensors. The system further includes a control module in communication with the plurality of tire pressure monitoring sensors through the plurality of low frequency transmitters. In a first phase of operation the control module causes the plurality of low frequency transmitters to transmit low frequency wireless signals to the plurality of tire pressure monitoring sensors causing the plurality of tire pressure monitoring sensors to transmit data to the control module at a first rate. In a second phase of operation the plurality of tire pressure monitoring sensors transmit data to the control module at a second rate.

In another aspect, the present invention provides a method of monitoring tire pressure of a plurality of wheel units of a vehicle. The method includes the step of placing a plurality of low frequency transmitters in wireless communication with a plurality of tire pressure monitoring sensors. The method further includes in a first phase causing the plurality of low frequency transmitters to transmit low frequency wireless signals at a first rate to the plurality of tire pressure monitoring sensors thereby causing the plurality of tire pressure monitoring sensors to transmit tire pressure data at a first rate. The method further includes in a second phase causing the plurality of low frequency transmitters to transmit low frequency wireless signals at a second rate to the plurality of tire pressure monitor sensors thereby causing the plurality of tire pressure monitoring sensors to transmit tire pressure data at a second rate, wherein the first rate of tire pressure data transmission is greater than the second rate of tire pressure data transmission.

In another aspect, the present invention provides a tire pressure monitoring sensor. The sensor includes a central processing unit, a pressure sensor configured to generate tire pressure data, a low frequency wireless receiver, and a radio frequency wireless transmitter. During continued periodic reception of signals by the low frequency wireless receiver the control unit causes the high frequency wireless transmitter to transmit the tire pressure data at a first rate. During termination of continued periodic reception of signals by the low frequency wireless receiver the control unit causes the high frequency wireless transmitter to transmit the tire pressure data at a second rate.

These and other features of the present invention can be best understood from the following specification and drawings, the following of which is a brief description.

DETAILED DESCRIPTION OF THE INVENTION

Figure 1:
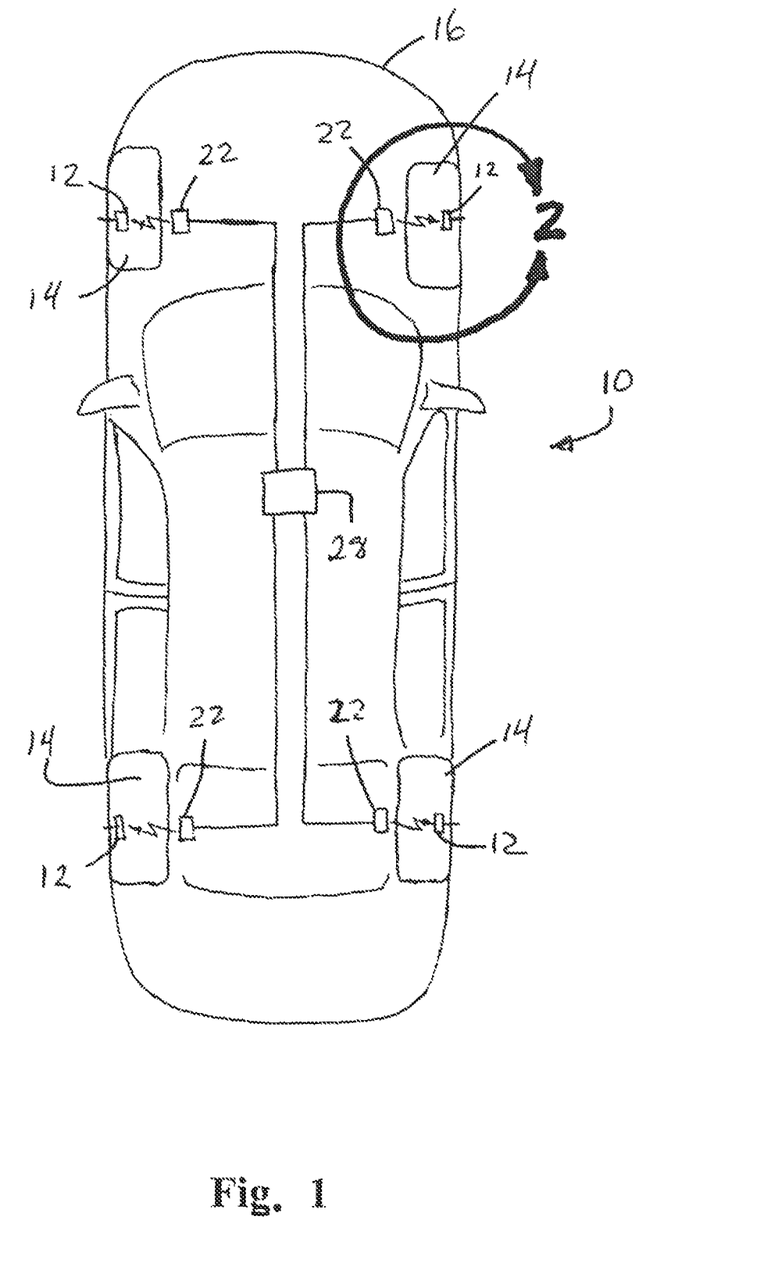
FIG. 1 illustrates a schematic view of an exemplary tire pressure monitoring system according to the teachings of the present invention.
Figure 2:
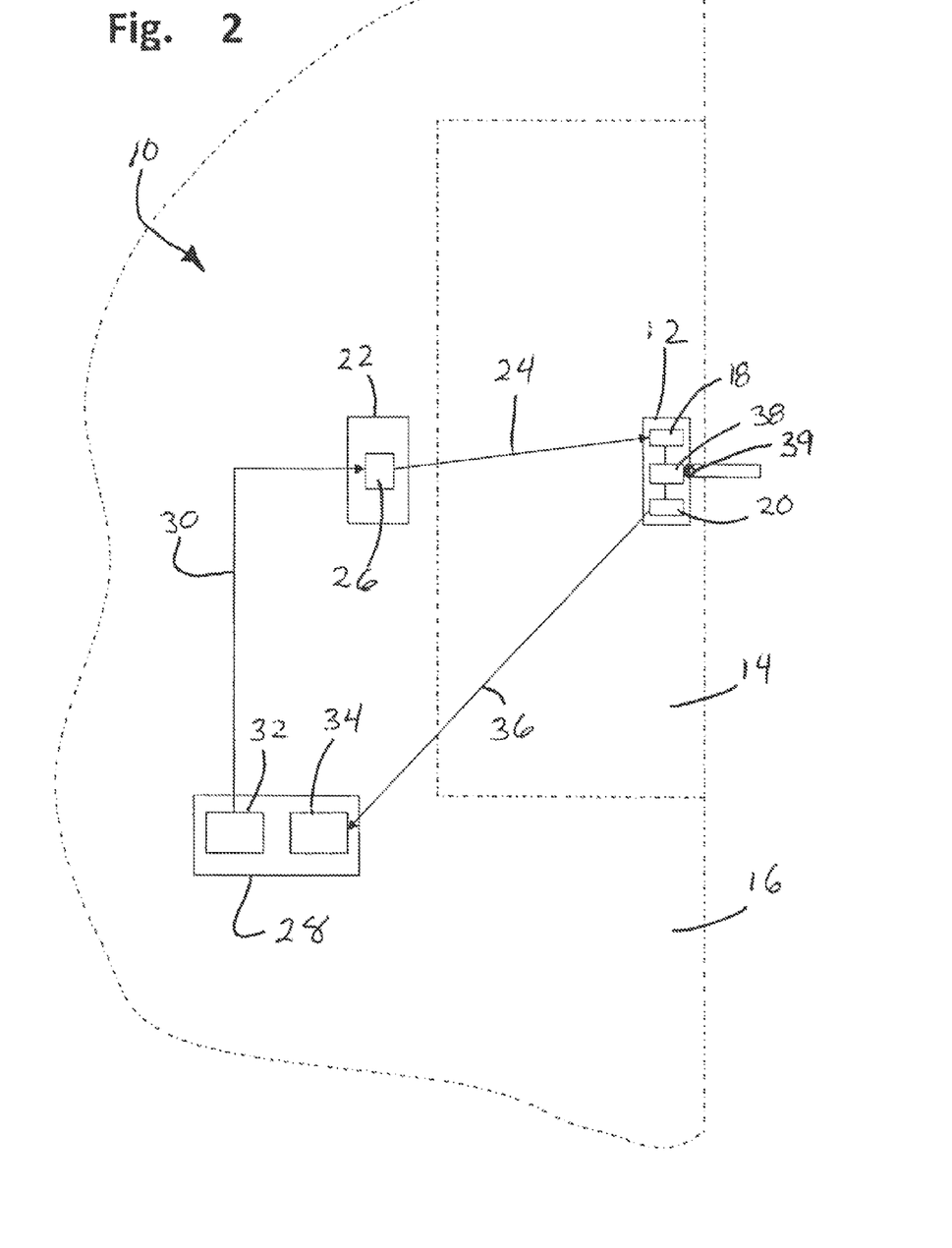
FIG. 2 illustrates an enlarged view of a wheel unit shown in FIG. 1.
Figure 5:
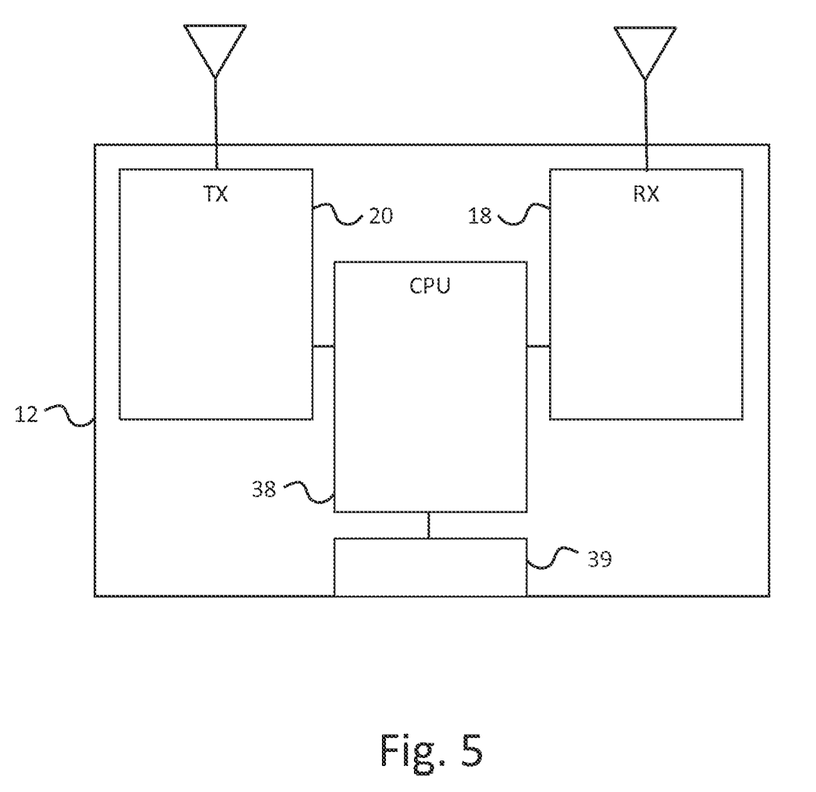
FIG. 5 illustrates a schematic view of an exemplary tire pressure monitoring sensor according to the teachings of the present invention.

Referring to FIGS. 1, 2, and 5, an exemplary embodiment of a tire pressure monitoring system 10 is shown. The system 10 includes a plurality of tire pressure monitoring sensors 12 each mounted to a wheel unit 14 of a vehicle 16. The tire pressure monitoring sensors 12 include a low frequency receiver 18, a radio frequency transmitter 20, and pressure sensor 39 for generating tire pressure data. The system 10 further includes a low frequency initiator 22 in wireless communication with the tire pressure monitoring sensor 12, via a first communication link 24. The low frequency initiator 22 includes a low frequency transmitter 26 for forming the first communication link 24. The low frequency initiator 22 is also in communication with a control module 28 of the system 10 through a second communication link 30. The control module 28 includes a signal generator 32 suitable for transmitting a signal to the low frequency initiator 22 for further causing the low frequency transmitter 26 to generate a low frequency wireless signal. The control module 28 further includes a radio frequency receiver 34 for receiving signals generated by the radio frequency transmitter 20 of the tire pressure monitoring sensor 12. The control module 28 and tire pressure monitoring sensor being in communication through a third communication link 36. It should be appreciated that the configuration shown in FIG. 2 would equally apply to other wheel units 14 of the vehicle 16 including 2, 3, 4 or more wheel units.

In one exemplary mode of operation, during a first phase of operation, the control module 28 generates and transmits periodic signals to the low frequency initiator 22, via the second communication link 30. Each signal generated by the signal generator 32 of the control module 28 causes the low frequency initiator 22 to generate a low frequency wireless signal which is received by the low frequency receiver 18 of the tire pressure monitoring sensor 12, via the first communication link 24. Upon reception of the low frequency wireless signals by the low frequency receiver 18, the radio frequency transmitter 20 transmits radio frequency signals to the radio frequency receiver 34 of the control module 28, at a first periodic rate, via third communication link 36. The radio frequency signals includes are pressure data, communication protocols or otherwise.

During a second phase of operation, the control module 28 discontinues the transmission of signals to the low frequency initiator 18, which discontinues the low frequency signals being transmitted to the tire pressure monitoring sensor 12. After the low frequency signals discontinue, a control unit 38 of the tire pressure monitoring sensor 12 modifies, or discontinues and replaces, the periodic radio frequency signal being generated to a revised or new periodic radio frequency signal, the signal having a second periodic rate longer than the first periodic rate.

Figure 3:
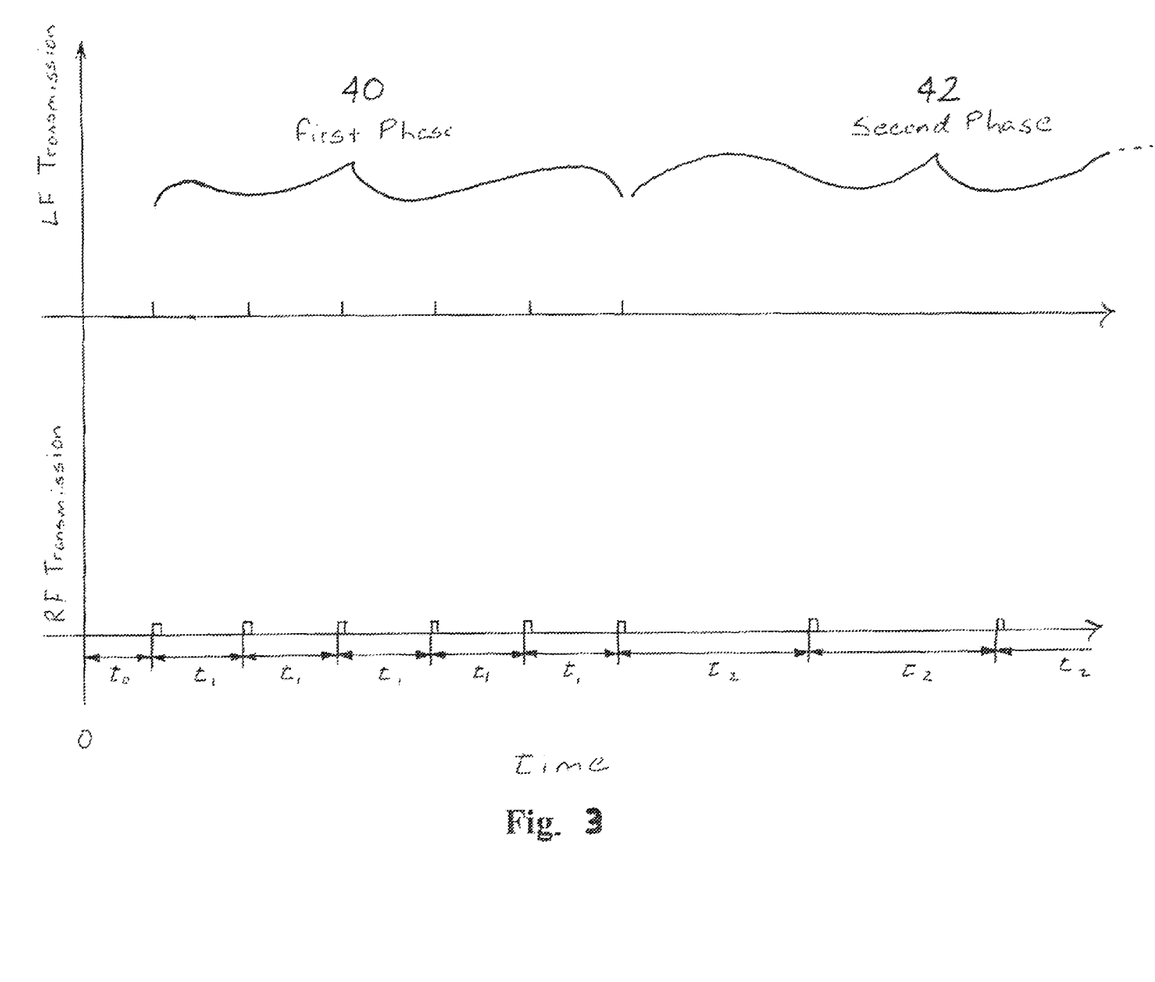
FIG. 3 illustrates an exemplary graph depicting transmission of signals according to the teachings of the present invention.

In greater detail, referring to FIG. 3, and exemplary graph of a first phase 40 and a second phase 42 of tire pressure data transmission of a tire pressure monitoring sensor 12 is shown. In this graph, low frequency transmission generated by the low frequency initiator 22 is shown in an upper portion of the graph and radio frequency transmission generated by the tire pressure monitor sensor 12 is shown in a lower portion of the graph. It should be appreciated that in one configuration the low frequency signals are in the range of about 30 to 300 kHz and in one exemplary embodiment the radio frequency signals are in the range of about 315 to 433 MHz.

The graph is depicted as starting from time zero, which in one exemplary embodiment, marks the time the engine is started. In another exemplary embodiment, the time zero mark the beginning of an operation mode of the vehicle. In yet another exemplary embodiment, the time zero mark the beginning of movement of the vehicle after a prolonged stationary period. Other possibilities exist. Further, it is contemplated that in one configuration, starting at time zero the system 10 is still in a previous mode, e.g. second phase 42 or otherwise. Accordingly, it is contemplated that front time zero to the first phase, e.g. '$t_0$', the transmission rate comprises the second phase 42 transmission rate. Thereafter, as described herein, the system enters a learning mode and the first transmission rate of the first phase.

After the initial time from time zero to the beginning of the first phase '$t_0$', the control module 28 causes the transmission by the low frequency initiator 22 to be periodic over a period of '$t_1$'. In one exemplary embodiment, the period of '$t_1$' marks the longest amount of time between transmissions a tire pressure monitor sensor should transmit, according to original equipment manufacturers' specifications or otherwise. In one exemplary embodiment, certain manufactures require '$t_1$' to comprise approximately 17 seconds. Other manufactures require '$t_0$' to be 34 seconds or otherwise. Accordingly, particularly with respect to tire pressure monitoring sensors being adapted for multiple applications, it is important that the sensor be capable of at least the shortest amount of time required by the original manufacturer of the system 10.

During the first phase 40, the low frequency initiator 22 and hence tire pressure monitoring sensor 12 continues to transmit low frequency signals and radio frequency signals at a periodic rate of '$t_1$'. It should be appreciated that each signal transmission of the tire pressure monitoring sensor 12 utilizes a portion of the potential energy of the battery of the tire pressure monitoring sensor. During the first phase 40, based upon the signals transmitted by the tire pressure monitoring sensors 12, the control module 28 of the system 12 determines the location, i.e. wheel unit 14 position, of each sensor. After this learning process is completed, it is no longer necessary for the tire pressure monitoring sensor 12 to transmit at this frequency rate and the control module 28 discontinues the transmission of signals to the low frequency initiator 22, which results in the low frequency initiator discontinuing the transmission of signals to the tire pressure monitoring sensor, thereby marking the end of the first phase 40. It should be appreciated that the ending of the first phase 40 may be indicated in other manners, such as change in transmission rate such as longer periods, shorter periods or variable periods. Other configuration are possible.

During the second phase 42, the absence of the periodic signal transmitted by the low frequency initiator 22 is observed and the control unit 38, with the assistance of suitable software, modifies the period of transmission by the radio frequency transmitter 20. As show in this second phase 42, the tire pressure monitoring sensor 12 continues to transmit tire pressure data albeit at the slower rate of '$t_2$'. The '$t_2$' rate of transmission continues until the vehicle exits a running mode and/or otherwise is motionless for a prolonged period of time. Thereafter, the learning process is reinitiated and transmission rates return to '$t_1$'.

Advantageously, not only does the reduction in transmission rate provide the ability to reduce the amount or energy being utilized by the battery, but also, the extended time allows for additional tire pressure monitoring protocols to be transmitted, which is particularly advantageous for sensors having multiple applications, vehicle makes, models, years, etc.

Figure 4:
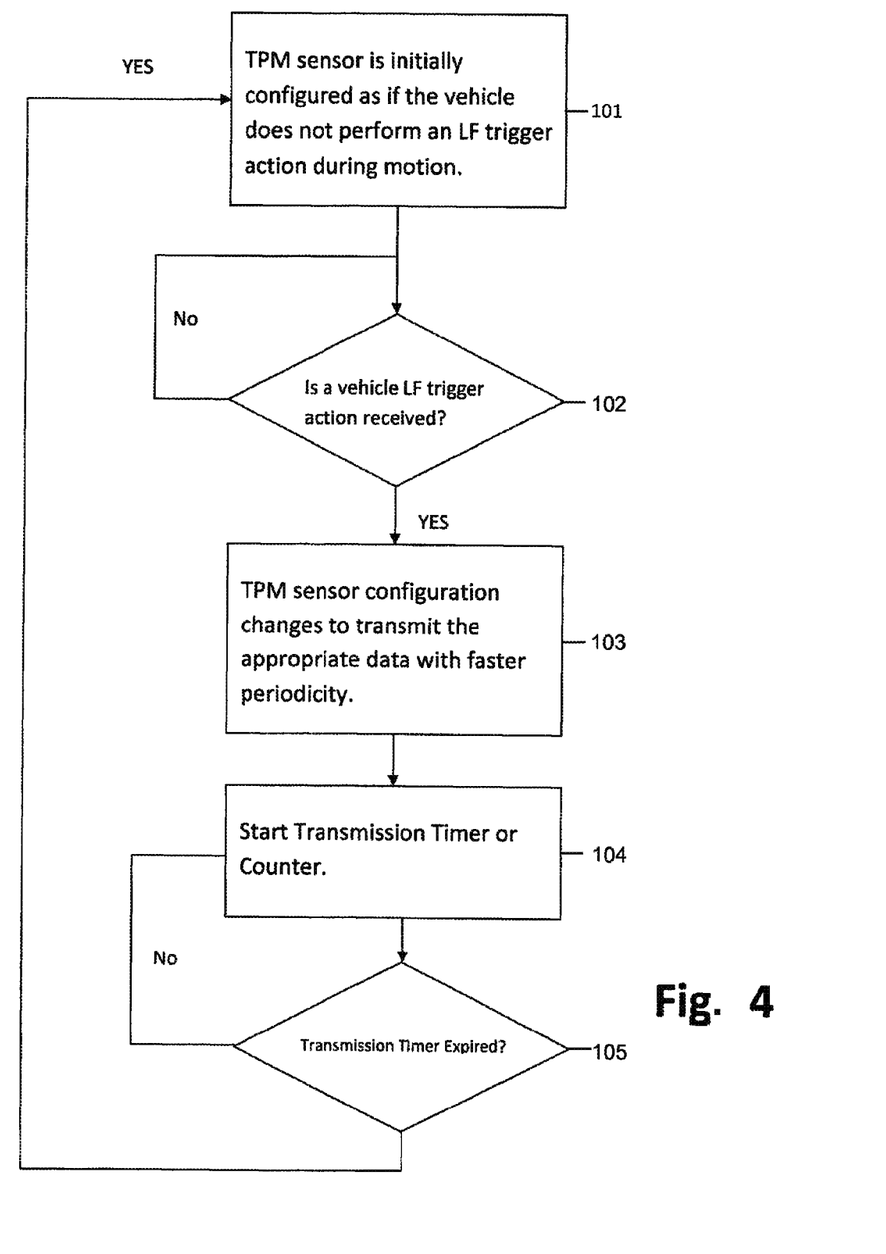
FIG. 4 illustrates an exemplary flow chart of operation of a tire pressure monitoring system according to the teachings of the present invention.

Referring to FIG. 4, a brief flowchart depicting features of the present invention are shown. In the flow chart shown, the system begins 101 the process in a mode that it had previously ended, e.g. second phase or otherwise. The system, and more particularly the tire pressure monitoring sensor 12, monitors 102 whether a low frequency trigger action or signal is received. This step is repeated until it is confirmed that a low frequency trigger action or signal is received. Once this is confirmed, the system operates 103 according to the first phase 40 wherein the first, and faster, periodic transmission rate is performed. Once the first phase 40 begins, a timer or counter is initiated 104 to provide a certain amount of time for the learning process to operate. This step is continued 105 until the timer has expired. Once expired, the system returns to the second phase, as was in the case at time zero.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of monitoring tire pressure of a plurality of wheel units of a vehicle, comprising the steps of:
   sending an incoming transmission from a frequency initiator at a first incoming transmission rate for a predetermined period of time;
   sending the incoming transmission from the frequency initiator at a second incoming rate in response to an elapse of the predetermined time;
   receiving the incoming transmission with a wireless receiver at a tire pressure monitoring sensor;
   detecting at the tire pressure monitoring sensor an incoming transmission rate for the incoming transmission;
   in response to detecting the incoming transmission rate is greater than zero, transmitting a first outgoing transmission at a first outgoing rate; and
   in response to detecting the incoming transmission rate is substantially zero, transmitting a second outgoing transmission at a second outgoing rate.

2. The method of claim 1, wherein the first outgoing rate is greater than the second outgoing rate.

3. The method of claim 1, further comprising:
   mounting at least one frequency initiator proximate to at least one of the plurality of wheel units.

4. The method of claim 3, further comprising:
   receiving at the at least one frequency initiator a control module transmission transmitted by a control module.

5. The method of claim 4, further comprising:
   operating the control module in a first phase when the vehicle operates in a first vehicle mode; and
   operating the control module in a second phase when the vehicle operates in a second vehicle mode.

6. The method of claim 5, further comprising:
   in the first phase, at the control module, transmitting the control module transmission to the frequency initiator at a rate greater than zero.

7. The method of claim 5, further comprising:
   in the second phase, at the control module, transmitting the control module transmission to the frequency initiator at a rate substantially equal to zero.

8. The method of claim 7,
   wherein the second incoming rate is substantially equal to zero.

9. The method of claim 3, wherein the tire pressure monitoring sensor is in communication with the frequency initiator via a first communication link, the frequency initiator is in communication with the control module via a second communication link, and the tire pressure monitoring sensor is in communication with the control module via a third communication link.

10. The method of claim 1 wherein the first outgoing transmission and the second outgoing transmission are transmitted to a control module.

11. The method of claim 10, further comprising:
    in response to receiving at least one of the first outgoing transmission and the second outgoing transmission, determining at the control module the location of at least one of the plurality of wheel units.

12. The method of claim 1, further comprising:
    modifying an outgoing transmission rate at a control unit of the tire pressure monitoring sensor.

13. The method of claim 1, further comprising:
    transmitting at least one of the first outgoing transmission and the second outgoing transmission at a transmitter of the tire pressure monitoring sensor.

14. The method of claim 1, further comprising:
    sensing tire pressure at a pressure sensor of the tire pressure monitoring sensor.

15. The method of claim 14, wherein at least one of the first outgoing transmission and the second outgoing transmission comprises data representative of tire pressure sensed at the pressure sensor.

16. A tire pressure monitoring system, comprimising:
    a low frequency initiator configured to send an incoming transmission at a first incoming transmission rate for a predetermined period of time and send the incoming transmission at a second incoming rate in response to an elapse of the predetermined time; and
    a tire pressure monitoring sensor including
       a pressure sensor configured to generate tire pressure data,
       a receiver configured to receive the incoming transmission from the low frequency initiator,
       a transmitter, and
       a central processing unit in communication with the pressure sensor, the transmitter, and the receiver, the central processing unit configured to detect an incoming transmission rate for the incoming transmission received at the receiver, the central processing unit further configured to cause the transmitter to transmit the tire pressure data at a first outgoing rate in response to detecting an incoming transmission rate greater than zero, the central processing unit further configured to cause the transmitter to transmit the tire pressure data at a second outgoing rate in response to detecting an incoming transmission rate substantially equal to zero.

17. The tire pressure monitoring sensor of claim 16, wherein the first outgoing rate is greater than the second outgoing rate.

18. The tire pressure monitoring sensor of claim 16, wherein the receiver is a low frequency wireless receiver and the transmitter is a high frequency wireless transmitter.

19. A non-transient computer usable medium having a computer readable program code embodied therein, the computer readable program code adapted to be executed to implement a method of monitoring tire pressure of a plurality of wheel units of a vehicle, the method comprising:

sending an incoming transmission from a frequency initiator at a first incoming transmission rate for a predetermined period of time;

sending the incoming transmission from the frequency initiator at a second incoming rate in response to an elapse of the predetermined time;

receiving the incoming transmission with a wireless receiver at a tire pressure monitoring sensor;

detecting at a tire pressure monitoring sensor an incoming transmission rate for the incoming transmission;

in response to detecting the incoming transmission rate is greater than zero, transmitting a first outgoing transmission at a first outgoing rate; and in response to detecting the incoming transmission rate is substantially zero, transmitting a second outgoing transmission at a second outgoing rate.

\* \* \* \* \*